United States Patent
Lin et al.

(10) Patent No.: US 6,778,299 B2
(45) Date of Patent: Aug. 17, 2004

(54) ERROR DIFFUSION WITH PARTIAL DOTS METHOD AND SYSTEM

(75) Inventors: Qian Lin, Santa Clara, CA (US); Daniel Tretter, Palo Alto, CA (US); Jian Fan, Cupertino, CA (US); Clayton Brian Atkins, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 392 days.

(21) Appl. No.: 09/802,401

(22) Filed: Mar. 9, 2001

(65) Prior Publication Data

US 2002/0145758 A1 Oct. 10, 2002

(51) Int. Cl.[7] .......................... H04N 1/405; H04N 1/409
(52) U.S. Cl. .................... 358/3.03; 358/3.05; 358/3.16; 358/3.17; 358/3.19; 358/3.22; 358/3.23; 358/3.26
(58) Field of Search ............................. 358/3.03, 3.04, 358/3.05, 3.13, 3.16, 3.17, 3.19, 3.22, 1.9, 3.23, 3.1, 3.12, 3.06, 3.26, 3.27; 382/252, 270

(56) References Cited

U.S. PATENT DOCUMENTS

| | | | |
|---|---|---|---|
| 4,680,645 A | 7/1987 | Dispoto et al. | 358/3.02 |
| 5,077,615 A | 12/1991 | Tsuji | |
| 5,359,433 A | 10/1994 | Nagase | |
| 5,615,021 A | 3/1997 | Lin | 358/3.1 |
| 5,748,336 A * | 5/1998 | Kakutani | 382/252 |
| 5,812,744 A | 9/1998 | Allebach et al. | 358/3.03 |
| 6,108,450 A * | 8/2000 | Ueda | 382/237 |
| 6,602,003 B2 * | 8/2003 | Kakutani | 358/1.9 |

FOREIGN PATENT DOCUMENTS

| | | |
|---|---|---|
| EP | 0398763 A2 | 11/1990 |
| EP | 0719033 A2 | 6/1996 |
| WO | WO 93/26116 | 12/1993 |

OTHER PUBLICATIONS

Ulicheny, Robert "Digital Halftoning", MIT Press 4th Printing 1993, pp. 63–64, 239–240, and 265.*
Ulichney, Robert "Digital Halftoning", MIT Press 4th Printing 1993, pp. 6 and 8–10.*
R. Ulichney, "The Void–and–Cluster Method for Dither Array Generation", In Proceedings, IS&T/SPIE Symposium on Elec. Imaging Science & Technology, pp. 155–158, San Jose, CA, Feb. 1993.
T. Mitsa and K. J. Parker, "Digital Halftoning Technique Using a Blue–Noise Mask", J. Opt. Soc. of Am. A, 9(11):1920–1929, Nov. 1992.
D. Lau, G. Arce, and N Allagher, "Digital Halftoning by Means of green–Noise Masks", J. Opt. Soc. Am. A, vol. 16, No. 7, pp. 1575–1586, Jul. 1999.

* cited by examiner

*Primary Examiner*—Scott Rogers

(57) ABSTRACT

A method and system for halftoning images that uses error diffusion with partial dots is provided. First, an input picture element (input pixel) that has a picture level (e.g., gray level) is received. Next, a reproducible gray level is generated based on the gray level of an input pixel. Then, a corrected gray level is generated based on the gray level of an input pixel and an error amount (e.g., error propagated or diffused from adjacent areas or pixels). A determination is made whether the corrected gray level is in a predetermined relationship with a threshold. When the corrected gray level is in a predetermined relationship with the threshold, the reproducible gray level (i.e., partial dot size) is provided as output. When the corrected gray level is not in a predetermined relationship with the threshold, a zero value is provided as output. It is noted that the output gray level and the corrected gray level are provided to an error distribution module for calculating an error and for propagating or diffusing the error to future adjacent areas or pixels.

20 Claims, 5 Drawing Sheets

ERROR DIFFUSION WITH PARTIAL DOTS METHOD AND SYSTEM

FIELD OF THE INVENTION

The present invention relates generally to image processing, and more particularly, to an error diffusion with partial dots method and system.

BACKGROUND OF THE INVENTION

In the area of digital printing, representation of the intensity of an image region on paper, i.e., the gray level, has been the object of a wide variety of algorithms published in the last decade. Digital printers are defined as those printers that are capable of making a mark, usually in the form of a dot, at a specified resolution in marks per unit length, typically dots per inch (dpi), on paper. To use such a digital printer to give the impression of gray level intensity, it has been common to place the marks, or dots, on the paper according to a variety of geometrical patterns such that a group of dots and dotless blank spots when seen by the eye gives a rendition of an intermediate tone between the initial paper stock, usually white, and total ink coverage, or solid density. In the ensuing paragraphs, discussions will be made in terms of white paper stock; it is understood that white paper stock is used as an illustration and not as a limitation of any invention.

An obvious problem arises when the resolution of the dot matrix on the paper is not very high, for example, 100 dpi or less, and the geometrical patterns being used become particularly visible to the eye. In this case the viewer is distracted from the image being represented by the image artifacts of geometrical patterns themselves and perceives the impression of an image of poor quality. The obvious solution to this problem is to work at very high resolutions, for example, 300 dpi or greater, so that those artifacts are less perceived and their negative effects become less glaring.

In 1976, Robert W. Floyd and Louis Steinberg published a paper in the Proceedings of the S.I.D., Vol. 17/2, entitled "An Adaptive Algorithm for Spatial Greyscale". In it they described an algorithm which they called "Error Diffusion" (ED). This algorithm provides a method for a gray scale with bilevel devices, that is, dot or no dot. According to this prior art scheme, gray level data representing a continuous tone image is subjected to a thresholding process whereby gray levels above a chosen threshold, for example, 50%, are assigned a dot to be printed and those below are not assigned a dot. The coarseness of this method is compensated for by keeping, track of the intensity error due to this process and propagating this error in specified amounts to adjacent picture elements, or "pixels", to weight the pixels in the thresholding process. This approach results in a more accurate representation of a grey tone over a small area encompassing several dots. Hence, perception of the image artifacts is diminished, and a better quality gray scale image is generated. Furthermore, the ED algorithm retains good edge quality in generated images to minimize the inherent "fuzziness" of a bilevel generated image.

It has been observed by subsequent investigators that the ED approach, even at resolutions of 300 dpi, still suffers severe limitations in producing quality images. Specifically, with the ED approach in producing gray scale images, the dots of a binary printer are of greater diameter than the separation of the addressable points; therefore, they can overlap. This overlapping then produces a nonlinear response to the representation of the grey tone discretization. In addition, the thresholding process also introduces undesirable patterns or textures that are visible to the eye when certain grey levels are printed.

U.S. Pat. No. 4,680,645 entitled, "Method for rendering grayscale images with variable dot sizes," by G. J. Dispoto. L. R. Mather, and J. D. Meyer, describes a method of halftoning that uses error diffusion with variable dot sizes to improve printing results. In this prior art approach, a lookup table is constructed with a list of dot sizes that a printer can produce, and the corresponding gray levels. For the gray level in an input image pixel, the nearest reproducible gray level is located in the lookup table and designated as the output gray level. The error between the input gray level and the output gray level is distributed to its surrounding pixels. This results in a halftone pattern with minimum contrast (i.e., at any particular gray level, the halftone pattern consists of the closest two dot sizes that will reproduce this gray level). White pixels are eliminated as early as possible when a gray ramp from white to black is printed.

An extension of using error diffusion with variable dot sizes that results in maximum contrast is described in U.S. Pat. No. 5,615,021 entitled, "Print N-tone images with imperceptible dots," by Q. Lin. FIG. 8 depicts the halftoning process described in U.S. Pat. No. 5,615,021. Suppose the input image is represented at some resolution D dots per inch (dpi). The first step is to halftone the image using multilevel error diffusion, whereby each pixel in image A is represented using more than 1 bit. Next, each pixel in image A is mapped to a binary superpixel, or block of pixels, wherein the dots are clustered together. The output is a binary halftone image rendered at a higher resolution than the input image. The dots are clustered together, but the dot cluster centers are spaced regularly.

One drawback of this approach is that the approach leads to a halftone of dot clusters arranged on a regular, rectangular lattice. This arrangement prevents the full utilization of the maximum capacity for rendering details that a printer is capable of. In other words, in the language of printing, this approach effectively reduces the "lines per inch" (lpi) of the print. In some aspects of appearance, this may resemble the results of a traditional clustered-dot halftoning. For that reason, it is reasonable to expect this prior art approach may lead to moiréartifacts, which is undesirable.

Based on the foregoing, there remains a need for a method and system for halftoning images that overcomes the disadvantages set forth previously.

SUMMARY OF THE INVENTION

A halftoning method and system that employs maximum contrast error diffusion with partial dots. According to one aspect of the present invention, a halftoning algorithm is provided that uses partial dots in highlight areas, and transitions to full dots in the mid-tone and shadow areas, thereby resulting in no visible dots in the printed image. Preferably, the partial dots are generated by utilizing a sub-pixel pulse modulation.

According to one embodiment of the present invention, a method of halftoning that uses error diffusion with partial dots is provided. First, an input picture element (input pixel) that has a picture level (e.g., gray level) is received. Next, a reproducible gray level is generated based on the gray level of an input pixel. Then, a corrected gray level is generated based on the gray level of an input pixel and an error amount (e.g., error propagated or diffused from adjacent areas or pixels). A determination is made whether the corrected gray level is in a predetermined relationship with a threshold.

When the corrected gray level is in a predetermined relationship with the threshold, the reproducible gray level (partial dot) is provided as output. When the corrected gray level is not in a predetermined relationship with a threshold, a zero value is provided as output. It is noted that the output gray level and the corrected gray level are provided to an error distribution module for calculating an error and for propagating or diffusing the error to future adjacent areas or pixels.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

A partial dot error diffusion method and system are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System 100

Figure 1:
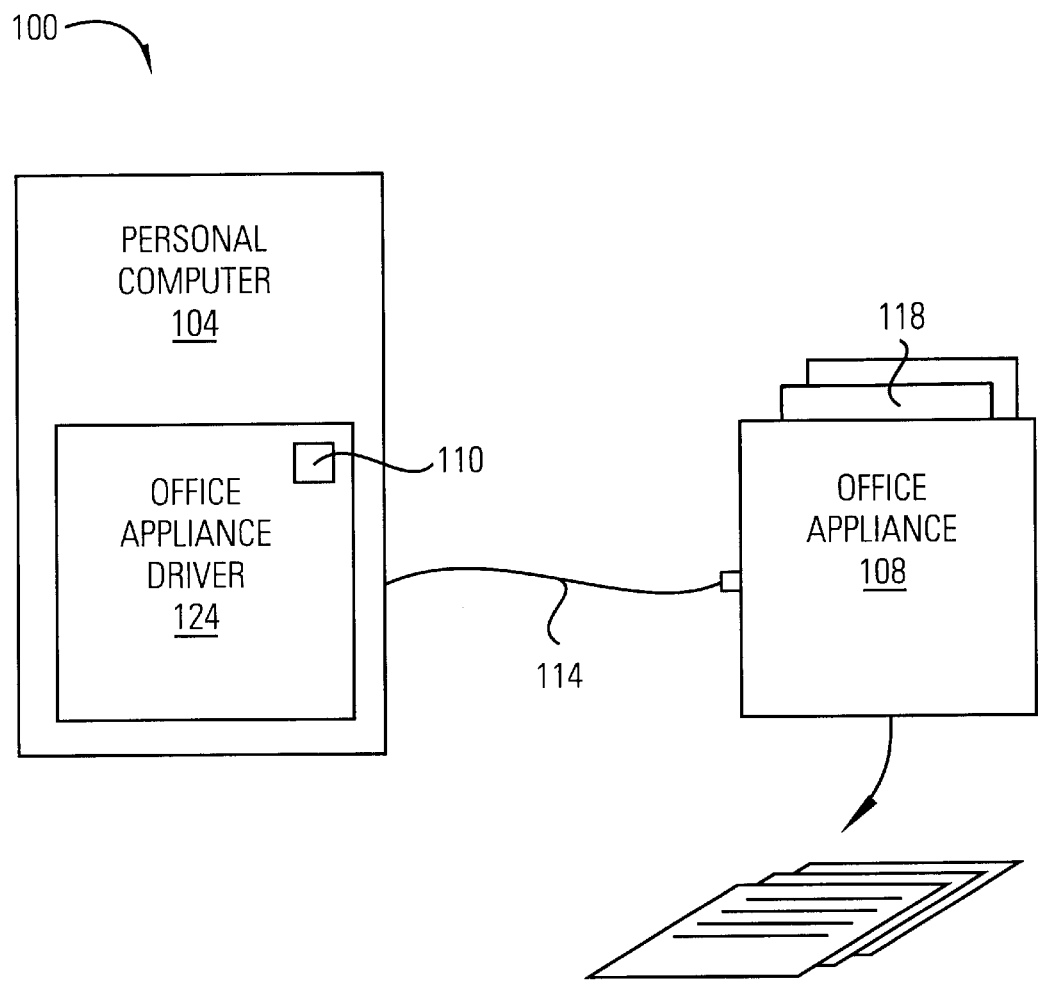
FIG. 1 is a block diagram illustrating an exemplary computer system in which the error diffusion with partial dots mechanism of the present invention can be implemented.

FIG. 1 is a block diagram illustrating an exemplary computer system 100 in which the error diffusion with partial dots mechanism 110 of the present invention can be implemented. The computer system 100 includes a personal computer (PC) 104 coupled to an office appliance 108 through a communication link 114, such as a wired medium (e.g., cable) or a wireless link (e.g., an radio frequency (RF) link or infrared (IR) link). The PC 104 can be any computing device, such as a portable computer, personal digital assistant, cellular telephone, etc.

The office appliance 108 can be a rendering device, such as a laser printer, inkjet printer, facsimile machine, digital copier, all-in-one office machine, etc. The office appliance 108 employs a halftoning process to render images and text onto a print medium 118 (e.g., paper). It is important for the office appliance 108 to have the capability to change or modulate the printed dot size. For example, many laser printers currently available have the facilities to change or modulate the printed dot size. As described in greater detail hereinafter, the present invention provides an output gray level that is dependent on dot size.

In this embodiment, the PC 104 includes a driver 124 for the office appliance 108, and the error diffusion with partial dots mechanism 110 of the present invention is incorporated as part of the driver. The error diffusion with partial dots mechanism 110 of the present invention can also be stored on any computer readable medium, such as a floppy disk, compact disc, or other medium that a user can use to load the PC 104 with the error diffusion method of the present invention. Alternatively, the error diffusion with partial dots mechanism 110 of the present invention can reside on a server that is connect to a network, such as the Internet. In this case, the error diffusion with partial dots mechanism 110 of the present invention can be accessed on an as-needed basis by any computing device (e.g., the PC 104) that has a communication facility for connecting to the network.

Software Embodiment

Figure 2:
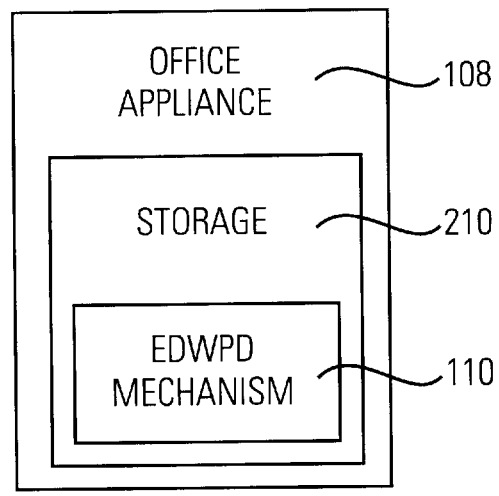
FIG. 2 illustrates an exemplary software embodiment of the error diffusion with partial dots mechanism of the present invention.

FIG. 2 illustrates an exemplary software embodiment of the error diffusion with partial dots mechanism of the present invention. In this embodiment, the error diffusion with partial dots mechanism 110 of the present invention can be implemented as software code that resides in a storage 210, such as a memory (e.g., a read only memory or a random access memory).

Hardware Embodiment

Figure 3:
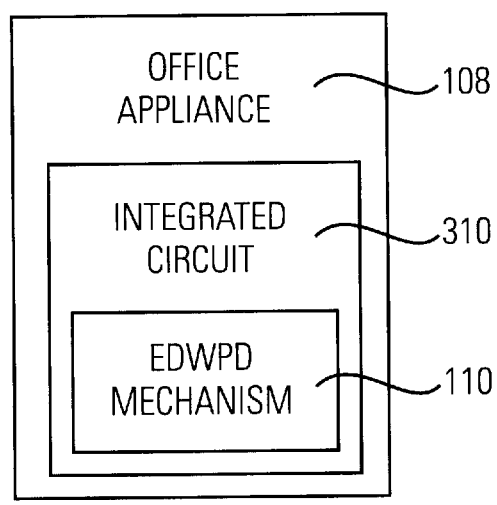
FIG. 3 illustrates an exemplary hardware embodiment of the error diffusion with partial dots mechanism of the present invention.

FIG. 3 illustrates an exemplary hardware embodiment of the error diffusion with partial dots mechanism of the present invention. In this embodiment, the error diffusion with partial dots mechanism 110 of the present invention can be implemented in hardware. For example, the office appliance 108 can include an integrated circuit 310 that has logic for performing the processing in accordance with the error diffusion with partial dots mechanism 110 of the present invention.

Accordingly, the error diffusion with partial dots mechanism 110 of the present invention can be implemented as software, hardware, firmware, or a combination thereof. Furthermore, the error diffusion with partial dots mechanism 110 of the present invention can be incorporated into any storage (e.g., a memory), computer readable medium (e.g., disk, compact disc, etc.), hardware element (e.g., an integrated circuit), or a combination thereof. Moreover, the error diffusion with partial dots mechanism 110 of the present invention can reside in a computing device (e.g., PC 104), an office appliance 108, a web server, or other intermediate device interposed between the computing device and the office appliance 108.

Error Diffusion

In a typical ED analysis in the prior art, gray levels are determined by the following three-step procedure. First, a printing decision is made based on a thresholding process. Second, an error is calculated as a result of the printing decision. Third, the calculated error is propagated, or diffused, to adjacent areas or pixels.

In an image representation, each picture element (pixel) of the image has an actual picture level $I(i,j)$, where i represents the ith column and j represents the jth row or scan. In general, the gray level at the input of the printing decision is not exactly equal to the bilevel value that results form the printing decision. Therefore, any printing decision for a pixel would probably contain an error element.

In a typical printing situation using ED, the printing decision for a pixel is made by comparing a corrected level of the pixel $Ic(i,j)$ with a threshold value T, that is, printing $P(i,j)=1$ when $Ic(i,j)$ is greater than T and $P(i,j)=0$ when $Ic(i,j)$ is equal or less than T. Then, the error is calculated as the difference between the corrected level and the level actually put on paper by the following expression:

$$E(i,j)=Ic(i,j)-\text{Imax}P(i,j),$$

where Imax is the maximal density of a dot, typically an ink spot.

This error $E(i,j)$ is propagated to adjacent future pixels that are not yet binarized so that $$Ic(i+m, j+n)=Ic(i+m, j+n)+E(i,j)W(m, n),$$

for $\{(m, n): m=1, \ldots, k; n=0\}$, which represent the future pixels on the current row; and
$\{(m, n): m=-k, \ldots, k; n=1, \ldots k\}$, which represent the future pixels on future rows.

It is noted that $W(m,n)$ is a set of weights used for error diffusion. It is noted that in some embodiments, the set of weights remain fixed for all pixels. In other embodiments, the set of weights may vary from pixel to pixel. An exemplary set of weights is described in the Floyd and Steinberg publication described previously. It is further noted that the current pixel is at m=0 and n=0.

Error Diffusion Employing Partial Dots

Figure 4:
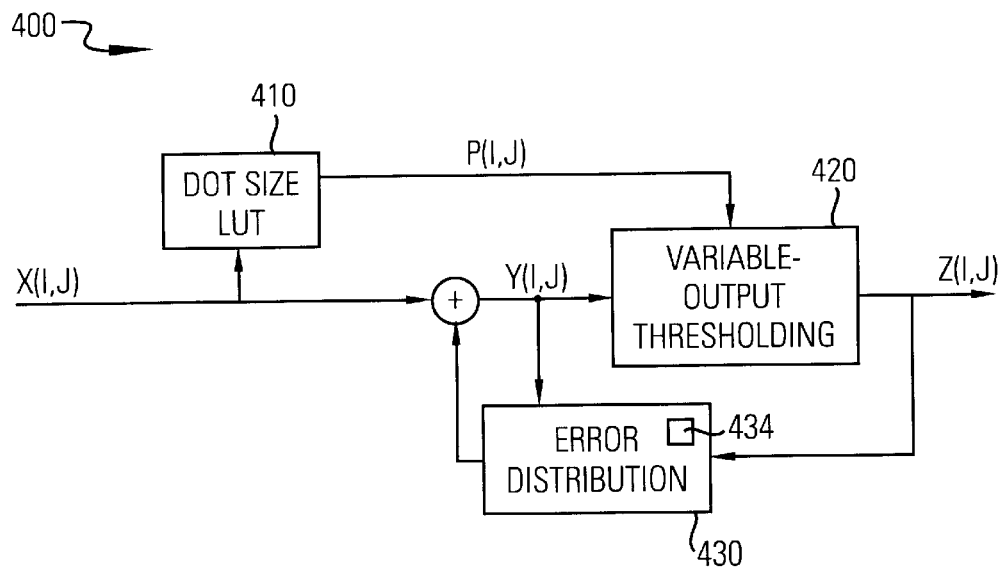
FIG. 4 is a block diagram illustrating in greater detail the error diffusion with partial dots module of FIG. 1 in accordance with one embodiment of the present invention.

FIG. 4 is a block diagram illustrating a system 400 for performing error diffusion with partial dots in accordance with one embodiment of the present invention. The system 400 includes a dot size look-up table (LUT) 410, a variable-output thresholding module (VTM) 420 coupled to the dot size LUT 410, and an error distribution module 430 that is also coupled to the VTM 420. The system 400 receives an input pixel value $x(i,j)$ and generates an output value $z(i,j)$.

In this embodiment, the error distribution module 430 includes an error measure determination unit 434 for receiving the output value $z(i,j)$ and the corrected value $y(i,j)$ and based thereon for generating an error measure. Subsequently, the error distribution module 430 applies a weight that is described in greater detail hereinafter to the error measure and selectively propagates the error to future pixels.

Figure 5:
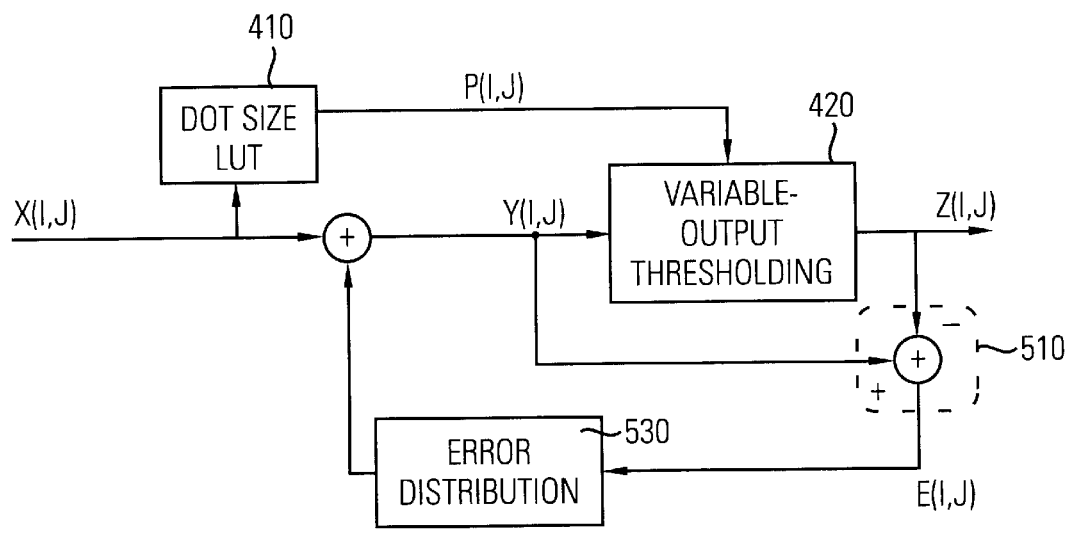
FIG. 5 is a block diagram illustrating in greater detail the error diffusion with partial dots module of FIG. 1 in accordance with an alternative embodiment of the present invention.

FIG. 5 is a block diagram illustrating in greater detail the error diffusion with partial dots module of FIG. 1 in accordance with an alternative embodiment of the present invention. In this embodiment, an error measure determination unit 510 is provided for determining an error measure based on the output value $z(i,j)$ and the corrected value $y(i,j)$. It is noted that the error measure determination unit 510 can be separate from the error distribution unit 530. In this embodiment, the error distribution unit 530 receives the error measure from the error measure determination unit 510, applies an appropriate weight, and distributes the error to future pixels. Future pixels are those pixels that are not yet processed. Typically, pixels are processed in raster order. The error measure determination unit 510 can be implemented as an adder that adds the corrected value $y(i,j)$ to a negative output value $(-z(i,j))$.

Specifically, the methodology in accordance with the preferred embodiment of the invention can be illustrated with the following procedures:

Creating a Dot Size Lookup Table 410

One aspect of the present invention is a dot size look-up table 410 that receives as input the input pixel $x(i, j)$ and provides as output the reproducible gray level value that corresponds to a partial dot size to be rendered by the printer. Preferably, the variable reproducible gray level value $p(i, j)$ is selected according to the input gray level $x(i, j)$. For example, the variable reproducible gray level $p(i, j)$ can be small in high light regions, and large in shadow regions. When the value of $x(i, j)$ is between 0 and 255, the value of $p(i, j)$ is between 0 and 255.

Figure 6:
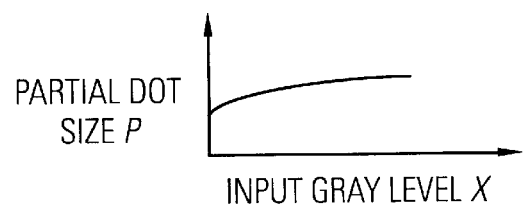
FIG. 6 is a partial dot size versus input gray level graph in accordance with one embodiment of the present invention.

FIG. 6 illustrates an exemplary variable reproducible gray level $p(i, j)$ versus input gray level $x(i, j)$ graph. In the lightest gray level, the partial dot is generated with, for example, 50% of the regular pulse width. The percentage value may be selected so that dots just get to develop and still are not visible to the eye. As the input gray level gets darker, the partial dot size also gets larger. It is noted that other reproducible gray level $p(i, j)$ versus input gray level functions having different shapes may be utilized to suit a particular application.

This lookup table is then used during the printing decision to determine the actual dot size to be deposited on a surface. An exemplary dot size LUT is set forth in TABLE I.

TABLE I

| INPUT GRAY LEVEL | DOT SIZE |
| --- | --- |
| GL1 | S1 |
| GL2 | S2 |
| GL3 | S3 |
| . | . |
| . | . |
| . | . |
| GLN | SN |

Variable-Output Thresholding Module

The variable-output thresholding module (VTM) 420 includes a first input for receiving a reproducible gray level, $p(i,j)$, (hereinafter also referred to as a "partial dot size"), a second input for receiving a corrected gray level $y(i,j)$, and an output for generating an output gray level $z(i,j)$. The variable-output thresholding module (VTM) 420 selectively generates either a zero value or a variable reproducible gray level $p(i, j)$. The zero value indicates no dot while the variable reproducible gray level indicates a partial dot. It is noted that the value of $p(i, j)$ can change from input pixel to input pixel (i.e., the reproducible gray level is dependent on i and j).

The error diffusion with partial dots of the present invention results in a printed texture that is very smooth without visibility of artifacts that are usually associated with prior art error diffusion algorithms.

Preferably, the variable-output thresholding module 420 performs the following operation:

$z(i,j)=p(i,j)$, if $y(i,j)>t(i,j)$
   0, otherwise, where $t(i,j)$ is a threshold.

The threshold can be a predetermined threshold or a randomly generated threshold. Examples of predetermined thresholds include thresholds that are generated by employing a traditional clustered dot halftone screen, a dispersed dot or blue noise halftone screen, and a green noise halftone screen. An example of using blue noise masks is set forth in T. Mitsa and K. J. Parker, "Digital Halftoning Technique Using a Blue-Noise Mask", J. Opt. Soc. of Am. A, 9(11):1920–1929, November 1992, which is hereby incorporated by reference. An example of using green noise masks is set forth in D. Lau, G. Arce, and N Allagher, "Digital Halftoning by Means of green-Noise Masks", J. Opt. Soc. Am. A, Vol. 16, No. 7, pages 1575–1586, July 1999, which is hereby incorporated by reference.

One aspect of the present invention is to allow a designer to modify the threshold to adapt to a particular printing process. The threshold can be selectively modified by the designer to optimize and adapt to the selected printing process (e.g., laser or ink-jet printing process). It will be apparent to one skilled in the art that having a low threshold encourages a dot to be printed, while having a high threshold discourages a dot to be printed. Consequently, an advantage of the present invention is that a designer can select the threshold so that the dot patterns generated by this invention are amenable for printing on the intended marking device (e.g., printer).

For example, it is well known that for laser printing it may be preferable to use a halftoning that results in clusters of dots. To take this into account, the threshold can be selected to encourage the formation of dot clusters. One way to do this is to employ a clustered-dot screen as an array of thresholds to be used in the present invention. Using a ColorSmooth Dither screen would also be appropriate, provided that the CSD screen is designed to produce clusters of dots. Using a green-noise screen may also be appropriate.

Similarly, it is well known that dispersed-dot printing techniques may be more suitable for ink-jet printing processes. To take this into account, the threshold can be selected to encourage patterns of dots dispersed from one another. One way to do this is to employ a blue-noise or dispersed-dot screen as an array of thresholds to be used in the present invention.

Preferably, t(i,j) is a random threshold for dispersed-dot approaches and a non-random threshold for clustered-dot approaches as described in greater detail hereinafter.

For example, for a CMYK image, ColorSmooth dither matrices can be used to generate the threshold t(i,j). ColorSmooth dither matrices and the process for generating such dither matrices are described in U.S. Pat. No. 5,812,744, entitled "Joint Design of Dither Matrices for a Set of Colorants," by J. Allebach and Q. Lin, which is incorporated by reference herein. Each color plane in the CMYK image can be halftoned independently, and the threshold t(i,j) for a particular plane can be generated by using the corresponding ColorSmooth dither matrix element $t_{csd}(i,j)$ in the following expression:

$$t(i,j)=0.3*(128-t_{csd}(i,j))+p(i,j)/2.$$

It is to be understood that the threshold can be generated by employing other techniques, such as those techniques set forth in R. Ulichney, "The Void-and-Cluster Method for Dither Array Generation", In Proceedings, IS&T/SPIE Symposium on Elec. Imaging Science & Technology, pages 155–158, San Jose, Calif., February 1993, which is hereby incorporated by reference.

Processing Steps

Figure 7:
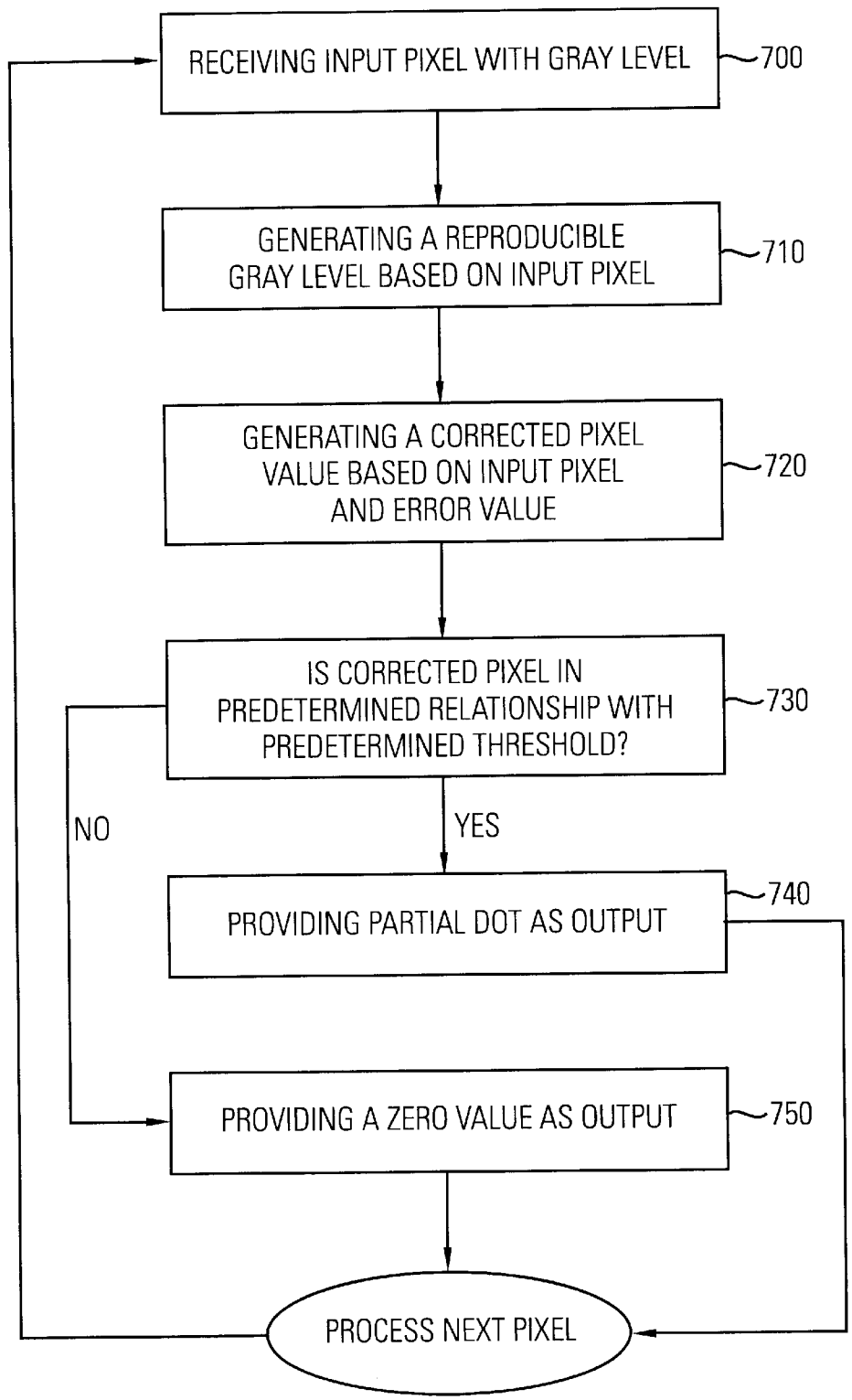
FIG. 7 is a flowchart illustrating the steps performed by the error diffusion with partial dots mechanism in accordance with one embodiment of the present invention.

FIG. 7 is a flowchart illustrating the steps performed by the error diffusion with partial dots mechanism in accordance with one embodiment of the present invention. In step 700 an input picture element (input pixel) having a picture level (e.g., gray level) is received. In step 710, a reproducible gray level is generated based on the gray level of an input pixel. In step 720, a corrected gray level is generated based on the gray level of an input pixel and an error amount (e.g., error propagated or diffused from previous areas or pixels (i.e., pixels that are already processed)). In step 730, a determination is made whether the corrected gray level is in a predetermined relationship with a threshold. When the corrected gray level is in a predetermined relationship with a threshold, in step 740, the reproducible gray level (partial dot) is provided as output. When the corrected gray level is not in a predetermined relationship with the threshold, in step 750, a zero value (no dot) is provided as output. It is noted that the output gray level is also provided to the error distribution module 430. It is noted that the threshold can be a predetermined threshold or a randomly generated threshold. As described hereinafter, the threshold can be a threshold array (e.g., a halftone screen).

This halftoning procedure of the present invention is repeated until all pixels have been assigned an output pixel value that is either a zero value (no dot) or a partial dot value corresponding to a particular gray level. When this is accomplished, the data is forwarded to the printer, which then deposits dots of various sizes in accordance with the output data. The image resulting will be substantially free of undesired image artifacts in accordance with the preferred embodiment of the invention.

One aspect of the partial dot size error diffusion of the present invention is that as the gray level increases, the dot size (or density) increases, while the number of dots also increases. This result is achieved in an efficient manner and can be implemented in a cost-effective fashion.

When this partial dot error diffusion algorithm is applied on input images that range from scanned compound documents to graphics and text, the following results are noted. With scanned compound documents, the most visible benefit is the significant reduction in moire patterns. With graphics and text images, the most visible benefit is the smooth edges and the fine thin lines.

Figure 8:
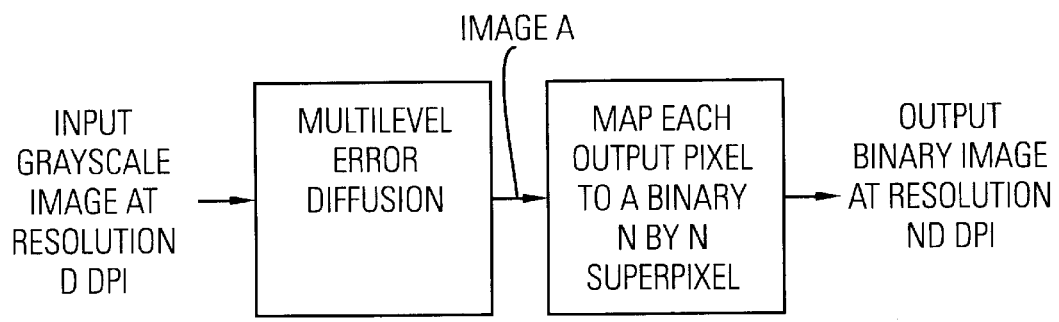
FIG. 8 illustrates a prior art halftoning system.

In contrast to the prior art halftoning method illustrated in FIG. 8, the present invention does not lead to clusters of printer dots. Rather, the halftoning method of the present invention relies on the printer to modulate the size of individual dots. In this regard, printer dots are not clustered together. Consequently, the maximum detail rendition of the printer can be realized. Furthermore, the dot distribution of the present invention is stochastic rather than regular. Accordingly, the halftoning process of the present invention is less likely to exhibit moire artifacts.

Extension to Clustered-Dot Patterns

The error diffusion with partial dots mechanism of the present invention can be extended to generate clustered-dot halftone patterns that tend to be more stable for certain applications. In this embodiment, by using clustered-dot stochastic dither matrix (e.g., a green noise mask) for the threshold array, the final halftone pattern is encouraged to be clustered-dot. For some printers, such as laser printers, the clustered-dot halftone pattern is more stable.

It is noted that the effects of the variable-output thresholding module 420 can be altered by modifying the threshold array (i.e., t(i,j)) that is employed therein. The ColorSmooth Dither (CSD) matrix is an example of a dispersed-dot threshold array. In a CSD array, thresholds that are numerically close to one another are spatially dispersed, so that using CSD in the variable-output thresholding encourages printed dots to be spatially isolated and dispersed. When the marking device (e.g., office appliance 108) is capable of rendering spatially isolated dots in a stable manner, dispersed-dot threshold array are preferred since they allow greater details to be rendered.

However, it is well-known that the electrophotographic (laser) printer process is relatively incapable of stably rendering spatially isolated dots. In such processes, a clustered-dot threshold array may be utilized. The use of a clustered-dot halftone screen for the threshold encourages the formation of dot clusters, where each cluster includes multiple printer dots. This approach is more amenable to the laser printing process.

In the foregoing specification, the invention has been described with reference to specific embodiments thereof. It will, however, be evident that various modifications and changes may be made thereto without departing from the broader scope of the invention. For example, the error diffusion with partial dots mechanism of the present invention has been described herein above mainly for gray scale images. However, it will become apparent to one of ordinary skill in the art that the error diffusion with partial dots mechanism of the present invention can be utilized to halftone color images. For example, one could apply the error diffusion with partial dots mechanism of the present invention to independently halftone different color planes (e.g. cyan, magenta, yellow and black (CMYK) color planes, or red, green blue (RGB) color planes). The specification and drawings are, accordingly, to be regarded in an illustrative rather than a restrictive sense.

What is claimed is:

1. A method for halftoning a digital image having a plurality of input pixels comprising:

receiving an input pixel at a dot size look-up table;

generating a reproducible gray level based on a gray level of at least one input pixel using the dot size look-up table;

generating a corrected gray level based on the gray level of at least one input pixel and an error amount;

determining whether the corrected gray level is in a predetermined relationship with a threshold;

when the corrected gray level is in a predetermined relationship with the threshold, providing the reproducible gray level as output; and when the corrected gray level is not in a predetermined relationship with the threshold, providing a zero value as output.

2. The method of claim 1 further comprising the step of providing an error measure to an error distribution module;

wherein the error measure is based on the output gray level and the corrected gray level;

wherein the error distribution module propagates the error measure to future pixels.

3. The method of claim 1 further comprising the step of providing the output gray level and the corrected gray level to an error distribution module;

determining the error measure based on the output gray level and the corrected gray level; and propagating the error measure to future pixels.

4. The method of claim 1 wherein the threshold is one of predetermined threshold and a randomly generated threshold.

5. The method of claim 4 wherein the predetermined threshold is generated by employing a halftone screen.

6. The method of claim 5 wherein the halftone screen is one of a blue noise halftone screen, a clustered dot halftone screen, and a green noise halftone screen.

7. The method of claim 1 wherein the step of determining whether the corrected gray level is in a predetermined relationship with a threshold includes:

determining whether the corrected gray level is greater than the threshold.

8. The method of claim 1 wherein the threshold is generated by the following expression:

$$t(i,j)=0.3*(128-t_{csd}(i,j))+p/2,$$

where $t_{csd}(i,j)$ is a ColorSmooth dither matrix element, and where p is the reproducible gray level value.

9. The method of claim 1 wherein the reproducible gray levels are manifested as partial dots generated by using sub-pixel modulation in the highlight areas and transitioning into full dots in the mid-tone and shadow areas.

10. The method of claim 1 wherein the output pixel value $z(i,j)$ is generated by the following expression:

$z(i,j)=p(i,j)$, if $y(i,j)>t(i,j)$ 0, otherwise, where $y(i,j)$ is the corrected gray level value, where p is the reproducible gray level value, and where $t(i,j)$ is the threshold.

11. The method of claim 5 wherein the method is implemented in an ink-jet printing process;

the method further comprising the step of:

selecting a threshold array that is suitable for the ink-jet printing process.

12. The method of claim 5 wherein the method is implemented in an laser printing process;

the method further comprising the step of:

selecting a threshold array that is suitable for the laser printing process.

13. A system for halftoning a digital image having a plurality of input pixels comprising:

a dot size look-up table for receiving an input pixel and responsive thereto for generating a reproducible gray level based on a gray level of at least one input pixel; and a variable output thresholding module for receiving a corrected gray level and the reproducible gray level and determining whether the corrected gray level is in a predetermined relationship with a threshold, when the corrected gray level is in a predetermined relationship with the threshold, providing the reproducible gray level as output; and when the corrected gray level is not in a predetermined relationship with the threshold, providing a zero value as output.

14. The system for halftoning a digital image having a plurality of input pixels of claim 13 further comprising:

a correction module for receiving an error measure and the input pixel and responsive thereto for generating the corrected gray level.

15. The system for halftoning a digital image having a plurality of input pixels of claim 14 further comprising:

an error distribution module coupled to the correction module for receiving an output gray level and a corrected gray level and responsive thereto for generating an error measure and distributing the error measure to future pixels.

16. The system for halftoning a digital image having a plurality of input pixels of claim 13 further comprising:

an error determination module for receiving an output gray level and a corrected gray level and responsive thereto for generating an error measure; and an error distribution module coupled to the error determination module and the correction module for receiving the error measure and distributing the error measure to future pixels.

17. A method for halftoning a digital image having a plurality of input pixels comprising:

employing a look-up table to receive an input pixel and generate a reproducible gray level based on a gray level of at least one input pixel;

receiving a corrected gray level and the reproducible gray level and determining whether the corrected gray level is in a predetermined relationship with a threshold;

providing the reproducible gray level as output when the corrected gray level is in a predetermined relationship with the threshold; and providing a zero value as output when the corrected gray level is not in a predetermined relationship with the threshold.

18. The method for halftoning a digital image having a plurality of input pixels of claim 17 further comprising:
receiving an error measure and the input pixel and generating the corrected gray level.

19. The method for halftoning a digital image having a plurality of input pixels of claim 18 further comprising:
receiving an output gray level and a corrected gray level and generating an error measure and distributing the error measure to future pixels.

20. The method for halftoning a digital image having a plurality of input pixels of claim 17 further comprising:
receiving an output gray level and a corrected gray level and generating an error measure; and
receiving the error measure and distributing the error measure to future pixels.

* * * * *